fication Search

United States Patent
Harada et al.

(10) Patent No.: US 9,540,453 B2
(45) Date of Patent: Jan. 10, 2017

(54) METHOD FOR PRODUCING MODIFIED CELLULOSE NANOFIBERS

(71) Applicant: DIC Corporation, Tokyo (JP)

(72) Inventors: Tomoaki Harada, Sakura (JP); Kenichi Hamada, Sakura (JP); Kazuo Itoya, Sakura (JP)

(73) Assignee: DIC Corporation, Tokyo (JP)

(*) Notice: Subject to any disclaimer, the term of this patent is extended or adjusted under 35 U.S.C. 154(b) by 0 days.

(21) Appl. No.: 14/899,765

(22) PCT Filed: May 13, 2014

(86) PCT No.: PCT/JP2014/062681
§ 371 (c)(1),
(2) Date: Dec. 18, 2015

(87) PCT Pub. No.: WO2015/040884
PCT Pub. Date: Mar. 26, 2015

(65) Prior Publication Data
US 2016/0137751 A1    May 19, 2016

(30) Foreign Application Priority Data
Sep. 18, 2013   (JP) .................. 2013-192947

(51) Int. Cl.
*C08B 3/12*    (2006.01)
*C08B 15/00*   (2006.01)
*C08L 1/10*    (2006.01)

(52) U.S. Cl.
CPC .............. *C08B 15/00* (2013.01); *C08B 3/12* (2013.01); *C08L 1/10* (2013.01); *C08L 2205/16* (2013.01)

(58) Field of Classification Search
CPC ............... C08B 3/12; C08B 15/00; C08L 1/10
USPC ................................................ 525/35; 524/35
See application file for complete search history.

(56) References Cited

U.S. PATENT DOCUMENTS 8,735,470 B2 *  5/2014  Takizawa .................. C08J 3/226
                                                         524/35

FOREIGN PATENT DOCUMENTS

| JP | 2009-293167 A |   | 12/2009 |
| JP | 2009293167 A  | * | 12/2009 |
| JP | 2012-229350 A |   | 11/2012 |
| JP | 2012229350 A  | * | 11/2012 |
| JP | 2013-116928 A |   | 6/2013  |
| JP | 2013116928 A  | * | 6/2013  |
| WO | WO-2012/043558 A1 | | 4/2012 |
| WO | WO-2013/122209 A1 | | 8/2013 |

OTHER PUBLICATIONS

International Search Report mailed Aug. 12, 2014, issued for PCT/JP2014/062681.

* cited by examiner

*Primary Examiner* — Michael M Bernshteyn
(74) *Attorney, Agent, or Firm* — Locke Lord LLP

(57) ABSTRACT

Provided are modified cellulose nanofibers that can be easily formed into a composite with a resin containing a solvent and a resin composition that contains the modified cellulose nanofibers. A method for producing modified cellulose nanofibers is characterized in that a step of obtaining modified cellulose by causing cellulose having hydroxyl groups to react with a resin having an intramolecular polybasic anhydride structure and a step of miniaturizing the modified cellulose are performed in the same step. In this method, the polybasic anhydride structure is a cyclic polybasic anhydride structure obtained by ring formation through dehydration condensation of carboxyl groups in the molecule.

4 Claims, No Drawings

METHOD FOR PRODUCING MODIFIED CELLULOSE NANOFIBERS

TECHNICAL FIELD

The present invention relates to a method for producing modified cellulose nanofibers in which a step of obtaining modified cellulose by causing cellulose having hydroxyl groups to react with a resin having an intramolecular polybasic anhydride structure and a step of miniaturizing the modified cellulose are performed in the same step.

BACKGROUND ART

Recently developed cellulose nanofibers are plant-derived, natural-ingredient nanofillers and have drawn much attention as low-relative-density, high-strength materials for forming composites with resins. It is known that adding small amounts of cellulose nanofibers to resins has a reinforcing effect and increases mechanical strength such as toughness at break and bending strength.

Known examples of the method for obtaining cellulose nanofibers by miniaturizing cellulose having many hydroxyl groups to a nanometer order include a method that involves fibrillating cellulose in water or a hydrophilic solvent (refer to PTL 1 and PTL 2) and a method that involves fibrillating cellulose in a resin (refer to PTL 3).

All of cellulose nanofibers produced by the above-mentioned methods undergo agglomeration and sedimentation if they are mixed with organic solvents other than those, such as ethanol, which are highly hydrophilic. This is because these cellulose nanofibers are highly hydrophilic. Thus, it has been extremely difficult to disperse cellulose nanofibers in resins that contain such organic solvents.

Several proposals have been made to improve the dispersion state of cellulose nanofibers in a composition, the proposals including a method that involves providing modified cellulose nanofibers obtained by causing hydroxyl groups in cellulose nanofibers to react with an acid anhydride so as to half-esterify the cellulose nanofibers and improve the dispersion state in the composition (refer to PTL 4, PTL 5, and PTL 6). However, these methods do not improve dispersing of cellulose nanofibers in resins containing organic solvents.

A method for modifying cellulose nanofibers with a resin has been reported, which involves living radical polymerization (refer to PTL 7). However, this method has many limitations and difficulties such as difficulty of introducing an initiating group into cellulose nanofibers and inability to perform living radical polymerization in the presence of oxygen.

CITATION LIST

Patent Literature

PTL 1: Japanese Unexamined Patent Application Publication No. 2005-42283
PTL 2: Japanese Unexamined Patent Application Publication No. 2009-261993
PTL 3: International Publication No. 2012/043558
PTL 4: Japanese Unexamined Patent Application Publication No. 2009-293167
PTL 5: Japanese Unexamined Patent Application Publication No. 2011-105799
PTL 6: Japanese Unexamined Patent Application Publication No. 2012-229350
PTL 7: Japanese Unexamined Patent Application Publication No. 2009-263417

SUMMARY OF INVENTION

Technical Problem

An object of the present invention is to provide a simple method for producing modified cellulose nanofibers that can be easily dispersed in solvents.

Solution to Problem

The inventors of the present invention have conducted extensive studies and found a method for easily obtaining modified cellulose nanofibers in which a step of obtaining modified cellulose by causing cellulose having hydroxyl groups to react with a resin having an intramolecular polybasic anhydride structure and a step of miniaturizing the modified cellulose are performed in the same step. They have found that the modified cellulose nanofibers obtained by this production method have high dispersibility in solvents and can be directly made into composites with resins containing solvents. It has been found that this method offers modified cellulose nanofibers that can be easily dispersed in solvents. This has not been possible by causing low-molecular-weight polybasic anhydrides to bond with hydroxyl groups of cellulose nanofibers.

In other words, the present invention provides a method for producing modified cellulose nanofibers, in which a step of obtaining modified cellulose by causing cellulose having hydroxyl groups to react with a resin having an intramolecular polybasic anhydride structure and a step of miniaturizing the modified cellulose are performed in the same step. In this method, the polybasic anhydride structure is a cyclic polybasic anhydride structure obtained by ring formation through dehydration condensation of carboxyl groups in the molecule.

Advantageous Effects of Invention

According to the present invention, modified cellulose nanofibers can be easily obtained by performing a step of obtaining modified cellulose by causing cellulose having hydroxyl groups to react with a resin having an intramolecular polybasic anhydride structure and a step of miniaturizing the modified cellulose in the same step. Moreover, the resulting modified cellulose nanofibers can be easily mixed with a resin composition that contains a solvent.

DESCRIPTION OF EMBODIMENTS

Embodiments of the present invention will now be described in detail below. The description below concerns examples of embodiments of the present invention and does not limit the scope of the invention.

[Type of Cellulose]

Modified cellulose nanofibers in the present invention are obtained by miniaturizing various types of cellulose and can be used as a resin-reinforcing agent capable of enhancing resin's toughness at break or the like when contained in the resin. The cellulose in the present invention may be any cellulose that can be used as a material for miniaturization. Examples of such materials include pulp, cotton, paper, regenerated cellulose fibers such as rayon, cupra, polynosic, and acetate, bacterial cellulose, and animal-derived cellulose such as one derived from sea squirts.

These types of cellulose may have chemically modified surfaces if needed.

Both wood pulp and non-wood pulp are suitable as the pulp. Wood pulp comes as mechanical pulp and chemical pulp. Chemical pulp is more preferable for its low lignin content. Examples of chemical pulp are sulfide pulp, craft pulp, and alkali pulp and all are suitable for use. Straw, bagasse, kenaf, bamboo, reed, mulberry, flax, and the like can be used as the non-wood pulp.

Cotton is a plant mainly used as fibers for clothing. Raw cotton, cotton fibers, and cotton cloth can all be used.

Paper is produced by straining fibers taken from pulp. Used paper such as newspaper, paper milk cartons, and used copy paper are also suitable for use.

Examples of the cellulose used as the material for miniaturization include cellulose powder that has a particular particle size distribution and is prepared by disintegrating cellulose. Specific examples include KC Flock (registered trademark) produced by Nippon Paper Chemicals Co., Ltd., Ceolus (registered trademark) produced by Asahi Kasei Chemicals Corporation, and Avicel (registered trademark) produced by FMC Corporation.

[Modified Cellulose Nanofibers]

Modified cellulose nanofibers of the present invention can be produced by performing a step of obtaining modified cellulose by causing cellulose having hydroxyl groups to react with a resin having an intramolecular polybasic anhydride structure and a step of miniaturizing the modified cellulose in the same step. The method can be implemented by adding cellulose to a resin having an intramolecular polybasic anhydride structure and applying mechanical shear force to the resulting mixture. Examples of the means for applying shear force include a bead mill, an ultrasonic homogenizer, an extruder such as a single-screw extruder or a twin-screw extruder, a Banbury mixer, a grinder, and a known kneader such as a pressure kneader or a twin roll. From the viewpoint of obtaining stable shear force in a highly viscous resin, a pressure kneader is preferably used among these devices.

Cellulose that has undergone the miniaturization method of the present invention turns into modified cellulose nanofibers. According to the miniaturization method of the present invention, the miniaturization can be performed to 100 nm to 1000000 nm in a long axis direction and 5 nm to 1000 nm in a short axis direction, for example.

[Resin Having Intramolecular Polybasic Anhydride Structure]

The resin having an intramolecular polybasic anhydride structure according to the present invention is a resin that has a cyclic polybasic anhydride structure in a molecule, where the cyclic polybasic anhydride structure is obtained by ring formation through dehydration condensation of carboxyl groups in the molecule. As long as the effects of the present invention are not impaired, known resins can be used. A preferable example of the resin is a vinyl resin.

An example of a method for synthesizing a vinyl resin having an intramolecular polybasic anhydride structure is a method that involves polymerizing or copolymerizing a vinyl monomer and a polybasic anhydride. A method in which dehydration condensation is preformed after polymerization or copolymerization of a vinyl monomer and a polybasic acid so as to form anhydride rings, a method in which hydration condensation is performed after polymerization or copolymerization of a carboxyl-group-containing vinyl monomer so as to form anhydride rings, and a method that combines these methods can also be employed.

Preferable examples of the polybasic anhydride are as follows: Examples of linear or branched polybasic anhydrides include malonic anhydride, succinic anhydride, glutaric anhydride, adipic anhydride, pimelic anhydride, suberic anhydride, azelaic anhydride, sebacic anhydride, and maleic anhydride. Examples of cyclic polybasic anhydrides include hexahydrophthalic anhydride, methylhexahydrophthalic anhydride, tetrahydrophthalic anhydride, methyltetrahydrophthalic anhydride, cis-4-cyclohexene-1,2-dicarboxylic anhydride, 4-methyl-4-cyclohexene-1,2-dicarboxylic anhydride, methylbutenyltetrahydrophthalic anhydride, phthalic anhydride, trimellitic anhydride, pyromellitic anhydride, methylendomethylenetetrahydrophthalic anhydride, and endomethylenetetrahydrophthalic anhydride.

The vinyl monomer may be any vinyl monomer as long as the vinyl monomer does not contain hydroxyl groups, amino groups, and the like that react with carboxyl groups during synthesis or dehydration condensation. Examples thereof include (meth)acrylate ester derivatives, vinyl ester derivatives, maleate diester derivatives, (meth)acrylamide derivatives, styrene derivatives, vinyl ether derivatives, vinyl ketone derivatives, olefin derivatives, maleimide derivatives, and (meth)acrylonitrile. A (meth)acrylic resin obtained by polymerizing a (meth)acrylate ester derivative is particularly preferable as the vinyl resin.

Preferable examples of the vinyl monomers are as follows: Examples of the (meth)acrylate ester derivatives include methyl(meth)acrylate, ethyl(meth)acrylate, n-propyl (meth)acrylate, isopropyl(meth)acrylate, n-butyl(meth)acrylate, isobutyl(meth)acrylate, t-butyl(meth)acrylate, amyl (meth)acrylate, n-hexyl(meth)acrylate, cyclohexyl(meth) acrylate, t-butylcyclohexyl(meth)acrylate, 2-ethylhexyl (meth)acrylate, t-octyl(meth)acrylate, dodecyl(meth) acrylate, octadecyl(meth)acrylate, acetoxyethyl(meth) acrylate, phenyl(meth)acrylate, 2-methoxyethyl(meth) acrylate, 2-ethoxyethyl(meth)acrylate, 2-(2-methoxyethoxy) ethyl(meth)acrylate, 2-chloroethyl(meth)acrylate, glycidyl (meth)acrylate, 3,4-epoxycyclohexylmethyl(meth)acrylate, vinyl(meth)acrylate, 2-phenylvinyl(meth)acrylate, 1-propenyl(meth)acrylate, allyl(meth)acrylate, 2-allyloxyethyl (meth)acrylate, propargyl(meth)acrylate, benzyl(meth)acrylate, diethylene glycol monomethyl ether(meth)acrylate, diethylene glycol monoethyl ether(meth)acrylate, triethylene glycol monomethyl ether(meth)acrylate, triethylene glycol monoethyl ether(meth)acrylate, polyethylene glycol monomethyl ether(meth)acrylate, polyethylene glycol monoethyl ether(meth)acrylate, β-phenoxyethoxyethyl (meth)acrylate, nonylphenoxy polyethylene glycol(meth) acrylate, dicyclopentenyl(meth)acrylate, dicyclopentenyloxyethyl(meth)acrylate, trifluoroethyl(meth)acrylate, octafluoropentyl(meth)acrylate, perfluorooctylethyl(meth) acrylate, dicyclopentanyl(meth)acrylate, tribromophenyl (meth)acrylate, tribromophenyloxyethyl(meth)acrylate, and γ-butyrolactone(meth)acrylate.

Examples of the vinyl ester derivatives include vinyl acetate, vinyl chloroacetate, vinyl propionate, vinyl butyrate, vinyl methoxy acetate, and vinyl benzoate.

Examples of the maleate diester derivatives include dimethyl maleate, diethyl maleate, and dibutyl maleate.

Examples of the fumarate diester derivatives include dimethyl fumarate, diethyl fumarate, and dibutyl fumarate.

Examples of the itaconate diester derivatives include dimethyl itaconate, diethyl itaconate, and dibutyl itaconate.

Examples of the (meth)acrylamide derivatives include (meth)acrylamide, N-methyl(meth)acrylamide, N-ethyl (meth)acrylamide, N-propyl(meth)acrylamide, N-isopropyl (meth)acrylamide, N-n-butyl acryl(meth)amide, N-t-butyl (meth)acrylamide, N-cyclohexyl(meth)acrylamide, N-(2-methoxyethyl)(meth)acrylamide, N,N-dimethyl(meth)acrylamide, N,N-diethyl(meth)acrylamide, N-phenyl(meth)acrylamide, N-nitrophenyl acrylamide, N-ethyl-N-phenylacrylamide, N-benzyl(meth)acrylamide, (meth)acryloylmorpholine, diacetone acrylamide, N-methylolacrylamide, N-hydroxyethyl acrylamide, vinyl (meth)acrylamide, N,N-diallyl(meth)acrylamide, and N-allyl(meth)acrylamide.

Examples of the styrene derivatives include styrene, methyl styrene, dimethyl styrene, trimethyl styrene, ethyl styrene, isopropyl styrene, butyl styrene, hydroxy styrene, methoxy styrene, butoxy styrene, acetoxy styrene, chlorostyrene, dichlorostyrene, bromostyrene, chloromethylstyrene, and α-methyl styrene.

Examples of the vinyl ether derivatives include methyl vinyl ether, ethyl vinyl ether, 2-chloroethyl vinyl ether, hydroxy ethyl vinyl ether, propyl vinyl ether, butyl vinyl ether, hexyl vinyl ether, octyl vinyl ether, methoxy ethyl vinyl ether, and phenyl vinyl ether.

Examples of the vinyl ketone derivatives include methyl vinyl ketone, ethyl vinyl ketone, propyl vinyl ketone, and phenyl vinyl ketone.

Examples of the olefin derivatives include ethylene, propylene, isobutylene, butadiene, and isoprene.

Examples of the maleimide derivatives include maleimide, butyl maleimide, cyclohexyl maleimide, and phenyl maleimide.

Other examples include (meth)acrylonitrile, vinyl-substituted heterocyclic groups (such as vinyl pyridine, N-vinylpyrrolidone, and vinyl carbazole), N-vinyl formamide, N-vinylacetamide, N-vinylimidazole, and vinylcaprolactone.

[Functional Groups]

The vinyl resin according to the present invention may have functional groups. However, hydroxyl groups and amino groups that react with carboxyl groups during synthesis or dehydration condensation are not preferable.

The vinyl resin can be obtained by heating the vinyl monomer in a reactor in the presence of a polymerization initiator and, if needed, performing aging. The reaction conditions differ depending on the polymerization initiator and the solvent. For example, the reaction temperature is 30° C. to 150° C. and preferably 60° C. to 120° C. Polymerization may be conducted in the presence of an inert solvent.

Examples of the polymerization initiator include peroxides such as t-butyl peroxybenzoate, di-t-butyl peroxide, cumene perhydroxide, acetyl peroxide, benzoyl peroxide, and lauroyl peroxide; and azo compounds such as azobisisobutyronitrile, azobis-2,4-dimethylvaleronitrile, and azobiscyclohexanecarbonitrile.

Examples of the inert solvent include aliphatic hydrocarbon solvents such as hexane and mineral spirits; aromatic hydrocarbon solvents such as benzene, toluene, and xylene; ester solvents such as butyl acetate; alcohol solvents such as methanol and butanol; and aprotic polar solvents such as dimethylformamide, dimethylsulfoxide, and N-methylpyrrolidone. These solvents can be used alone or in combination.

In the present invention, the vinyl resins described above may be used alone or in combination. The vinyl resin according to the present invention may be a linear polymer or a branched polymer. A branched polymer may be a comb polymer or a star polymer.

[Molecular Weight]

The weight-average molecular weight of the vinyl resin used in the present invention is preferably 1000 or more from the viewpoint of good dispersibility of modified cellulose nanofibers in solvents and preferably 6000 or less from the viewpoint of miniaturization of cellulose.

[Ratio of Resin Having Intramolecular Polybasic Anhydride Structure to Cellulose]

In the present invention, the ratio of the resin having an intramolecular polybasic anhydride structure to the cellulose can be freely changed. In the case where a curing agent or a diluting resin is to be added after miniaturization, a higher resin-reinforcing effect is achieved by preliminarily increasing the cellulose concentration in the resin having an intramolecular polybasic anhydride structure to a relatively high level. However, if the ratio of the resin having an intramolecular polybasic anhydride structure is excessively low, not only a sufficient cellulose miniaturization effect cannot be obtained but also sufficient modification of cellulose nanofibers cannot be achieved. In a composition that contains cellulose and a resin having an intramolecular polybasic anhydride structure, the ratio of the cellulose is 10% to 90% by mass, preferably 30% to 80% by mass, and more preferably 40% to 70% by mass.

[Method for Recovering Modified Cellulose Nanofibers]

In recovering the modified cellulose nanofibers, the resin having an unreacted intramolecular polybasic anhydride structure may be left as is or may be removed by washing if needed. Examples of the solvent used in washing include ketone solvents such as acetone and methyl ethyl ketone; alcohol solvents such as methanol and ethanol; ester solvents such as ethyl acetate; and aprotic solvents such as NMP, DMF, and DMAC. Among these, acetone, methyl ethyl ketone, ethyl acetate, and the like are preferred since the solvents are easy to remove and can satisfactorily disperse modified cellulose nanofibers.

The modified cellulose nanofibers of the present invention are suitable for use in solvent-based forming materials, coating materials, paint materials, and adhesives since they have improved dispersibility in solvents.

The modified cellulose nanofibers of the present invention are also suitable for use in solvent-less forming materials, coating materials, paint materials, and adhesives as with unmodified cellulose nanofibers.

[Applications]

The resin composition according to the present invention is suitable for use in various applications. Examples thereof include automobile parts, airplane parts, electronic and electric parts, construction materials, container and package members, livingware, and sports and leisure goods. The applications are not limited to these.

EXAMPLES

The embodiments of the present invention will now be described in further detail below. The description below does not limit the scope of the present invention.

[Method for Synthesizing Vinyl Resin]

Synthetic Example 1

Production of Vinyl Resin (1)

Into a 3 L stainless steel separable flask, 950 g of methyl ethyl ketone was weighed and heated to 75° C. with a nitrogen stream under stirring at 250 rpm. Then 700 g of butyl acrylate, 100 g of styrene, and 100 g of maleic anhydride were weighed into a 1 L stainless steel container and stirred with a glass rod to obtain a monomer mixture. The monomer mixture was placed in a 1 L dropping funnel.

Then 50 g of methyl ethyl ketone, 0.2 g of 2,2'-azobis(2-methylbutyronitrile) ("V-59" produced by Wako Chemical Industries, Ltd.), and 100 g of thioglycolic acid were weighed and combined, and the resulting mixture was thoroughly stirred with a glass rod to obtain an initiator mixture. The initiator mixture was placed in a 300 mL dropping funnel. The monomer mixture and the initiator mixture were added to methyl ethyl ketone heated to 75° C. dropwise for 4 hours.

After completion of dropwise addition, the solution was retained at 75° C. for 20 hours to conduct polymerization. The solvent was removed from the vinyl resin obtained by polymerization to prepare a vinyl resin (1). One gram of the vinyl resin (1) was weighed and 5 g of toluene/methanol mixture (7/3 weight ratio) was added thereto, followed by stirring. The resulting mixture was placed in a 120° C. drier for 1 hour to remove the organic solvent therein. The solid content of the vinyl resin (1) was calculated from the weight measured after removal of the organic solvent. The solid content was 87%. The weight-average molecular weight of the vinyl resin (1) was 1900.

Synthetic Example 2

Production of Vinyl Resin (2)

Into a four-necked flask equipped with a thermometer, a stirrer, and a reflux condenser, 3000 parts of propylene glycol monomethyl ether acetate (MPA) was charged and heated to 130° C. under stirring. Then a mixed solution of 750 parts of 2-ethyl hexyl methacrylate (2EHMA), 200 parts of 2-hydroxyethyl methacrylate (HEMA), and 50 parts of methacrylic acid (MAA) and a mixed solution of 150 parts of "Perbutyl O (registered trademark)" (produced by NOF Corporation) were added thereto dropwise for 5 hours. After completion of dropwise addition, reaction was conducted at 130° C. for 12 hours and then the solvent was removed at a reduced pressure at 70° C. As a result, a solution of a vinyl resin (2) with a 90% solid content was obtained. The weight-average molecular weight of the vinyl resin (2) was 1800.

Synthetic Example 3

Production of Vinyl Resin (3)

Into a 3 L stainless steel separable flask, 950 g of methyl ethyl ketone was weighed and heated to 75° C. with a nitrogen stream under stirring at 250 rpm. Into a 1 L stainless steel container, 800 g of butyl acrylate, 100 g of styrene, and 100 g of maleic anhydride were weighed and the resulting mixture was stirred with a glass rod. Thereto, 50 g of methyl ethyl ketone and 60 g of "Perbutyl O (registered trademark)" (produced by NOF Corporation) were added and the resulting mixture was thoroughly stirred with a glass rod and mixed. The mixed solution was placed in a 1 L dropping funnel and added to methyl ethyl ketone heated to 75° C. dropwise for 4 hours. After completion of dropwise addition, the solution was retained at 75° C. for 12 hours to perform polymerization. The vinyl resin obtained by polymerization was assumed to be a vinyl resin (3). One gram of the vinyl resin (3) was weighed and combined with 5 g of a toluene/methanol mixed solution (7/3 weight ratio), followed by stirring. The resulting mixture was placed in a 120° C. drier for 1 hour to remove the organic solvent therein. The solid content of the vinyl resin (3) was calculated from the weight measured after the removal of the organic solvent. The solid content was 42%. The weight-average molecular weight of the vinyl resin (3) was 35000.

[GPC Measurement Method]

A diluted solution obtained by diluting the resin 50 fold with tetrahydrofuran (THF) was filtered through a filter (material: polytetrafluoroethylene, pore diameter: 0.2 μm) to prepare a measurement sample. The measurement sample was supplied to a gel permeation chromatograph (GPC, trade name "HLC-8220GPC" produced by Tosoh Corporation) and measurement was conducted at a sample flow rate of 1 mL/min at a column temperature of 40° C. The observed polystyrene-equivalent molecular weight of the resin was assumed to be the weight-average molecular weight. In the GPC measurement, HXL-X, G5000HXL, G3000HXL, G2000HXL, and G2000HXL (all produced by Tosoh Corporation) were used as the columns and a differential refractometer was used as the detector.

[Method for Producing Modified Cellulose Nanofibers]

Example 1

By using a pressure kneader (DRV0.3GB-E model) produced by Moriyama, 150 g of the vinyl resin (1) produced in Synthetic Example 1 and 150 g of a cellulose powder product "KC Flock (registered trademark) W100G" produced by Nippon Paper Chemicals Co., Ltd., were kneaded under pressure at 60 rpm for 180 minutes to miniaturize and modify the cellulose in the same step. As a result, modified cellulose nanofibers (hereinafter referred to as "CNF") (1) were obtained. A master batch, which was the resulting kneaded product of the resin and the modified CNF, was suspended in acetone so that the concentration was 0.1% and dispersed by using a T.K. Homomixer A produced by Tokushu Kikai Kogyo Co., Ltd., at 15000 rpm for 20 minutes. The resulting product was spread on glass to dry acetone and the miniaturization state of the cellulose was checked with a scanning electron microscope. Since presence of cellulose fibrils finer than 100 nm in terms of a length in the short axis direction was confirmed, miniaturization of the cellulose was found to be satisfactory.

Comparative Example 1

Method for Producing Cellulose Nanofibers

By using a pressure kneader (DRV0.3GB-E model) produced by Moriyama, 150 g of the vinyl resin (2) produced in Synthetic Example 2 and 150 g of a cellulose powder product "KC Flock (registered trademark) W100G" produced by Nippon Paper Chemicals Co., Ltd., were kneaded under pressure at 60 rpm for 180 minutes to miniaturize the cellulose. As a result, unmodified CNF (1) were obtained. A master batch, which was the resulting kneaded product of the resin and the CNF, was suspended in acetone so that the concentration was 0.1% and dispersed with a T.K. Homomixer A produced by Tokushu Kikai Kogyo Co., Ltd., at 15000 rpm for 20 minutes. The resulting product was spread on glass to dry acetone and the miniaturization state of the cellulose was checked with a scanning electron microscope. Since presence of cellulose fibrils finer than 100 nm in terms of a length in the short axis direction was confirmed, miniaturization of the cellulose was found to be satisfactory.

Comparative Example 2

By using a pressure kneader (DRV0.3GB-E model) produced by Moriyama, 150 g of the vinyl resin (3) produced in Synthetic Example 3 and 150 g of cellulose powder product "KC Flock (registered trademark) W100G" produced by Nippon Paper Chemicals Co., Ltd., were kneaded under pressure at 60 rpm for 180 minutes. A master batch, which was the resulting kneaded product of the resin and the cellulose, was suspended in acetone so that the concentration was 0.1% and dispersed with a T.K. Homomixer A produced by Tokushu Kikai Kogyo Co., Ltd., at 15000 rpm for 20 minutes. The resulting product was spread on glass to dry acetone and the miniaturization state of the cellulose was checked with a scanning electron microscope. Since presence of miniaturized cellulose was not confirmed, the product was assumed to be modified cellulose (1).

[Evaluation of Dispersibility in Solvent]

The modified CNF (1), the unmodified CNF (1), and the modified cellulose (1) each in an amount of 0.2 g were respectively placed in glass test tubes each together with 6.8 g of MEK and dispersed in MEK by thorough stirring. The test tubes were flipped 10 times to sufficiently disperse the modified pulp or pulp in MEK and left to stand still. Then sedimentation state of the modified CNF or the CNF was observed. After 1 minute of observation, the sample in which the CNF settled and the supernatant became transparent was assumed to have poor dispersion stability in MEK and the sample in which the pulp did not settle and the supernatant was suspended was assumed to have good dispersion stability in MEK. Thus the dispersibility of the modified CNF was evaluated.

TABLE 1

|  | Example 1 | Comparative Example 1 | Comparative Example 2 |
|---|---|---|---|
| Name | Modified CNF (1) | Unmodified CNF (2) | Modified cellulose (1) |
| Miniaturization of cellulose | Good | Good | Poor |
| Dispersion stability | Good | Poor | Fair |

INDUSTRIAL APPLICABILITY

According to the present invention, modified cellulose nanofibers can be easily obtained by performing a step of obtaining modified cellulose by causing cellulose having hydroxyl groups to react with a resin having an intramolecular polybasic anhydride structure and a step of miniaturizing the modified cellulose in the same step. Moreover, since the modified cellulose nanofibers have significantly improved dispersibility in solvents, the modified cellulose nanofibers are suitable for use in solvent-containing resin compositions whereas it has been difficult to use conventional CNF in such compositions. Accordingly, cellulose nanofibers, which have been used in some fields to form a composite material and impart higher mechanical strength, can also be used in coating materials, adhesives, and pressure-sensitive adhesives. For example, the modified cellulose nanofibers can be effectively used in interior materials, exterior materials, and structural materials of transportation systems such as automobiles, trains, ships, and airplanes, casings, structural materials, and inner parts of electric goods such as personal computers, televisions, and telephones, building materials, stationaries, casings of business equipment such as office appliances, sports and leisure goods, and structural members.

The invention claimed is:

1. A method for producing modified cellulose nanofibers, comprising a step of obtaining modified cellulose by causing cellulose having hydroxyl groups to react with a resin having an intramolecular polybasic anhydride structure and a step of miniaturizing the modified cellulose are performed in the same step, wherein the polybasic anhydride structure is a cyclic polybasic anhydride structure obtained by ring formation through dehydration condensation of carboxyl groups in the molecule.

2. The method for producing modified cellulose nanofibers according to claim 1, wherein the resin having an intramolecular polybasic anhydride structure is a vinyl resin.

3. The method for producing modified cellulose nanofibers according to claim 1, wherein the resin having an intramolecular polybasic anhydride structure has a weight-average molecular weight of from 1000 to 6000.

4. The method for producing modified cellulose nanofibers according to claim 2, wherein the resin having an intramolecular polybasic anhydride structure has a weight-average molecular weight of from 1000 to 6000.

* * * * *